(12) United States Patent
Matsumura (10) Patent No.: US 7,825,781 B2
(45) Date of Patent: Nov. 2, 2010

(54) TIRE PRESSURE MONITORING SYSTEM (75) Inventor: Takafumi Matsumura, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 250 days.

(21) Appl. No.: 12/192,608

(22) Filed: Aug. 15, 2008

(65) Prior Publication Data
US 2009/0072959 A1 Mar. 19, 2009

(30) Foreign Application Priority Data
Sep. 19, 2007 (JP) ............................. 2007-242087

(51) Int. Cl.
B60R 25/10 (2006.01)
(52) U.S. Cl. .................. 340/426.33; 340/447; 340/442; 340/825.58; 340/825.72; 331/1 R; 73/146.4; 73/146.5; 375/354; 375/355; 375/303; 375/308; 375/311
(58) Field of Classification Search ........................ None
See application file for complete search history.

(56) References Cited

U.S. PATENT DOCUMENTS

| 4,786,900 | A | * | 11/1988 | Karasawa et al. | .......... | 340/5.32 |
| 5,531,109 | A | * | 7/1996 | Tsagas | ........................ | 73/146.5 |
| 5,535,252 | A | * | 7/1996 | Kobayashi | ................... | 375/371 |
| 6,639,957 | B2 | * | 10/2003 | Cahill-O'Brien et al. | .... | 375/354 |
| 2003/0152177 | A1 | * | 8/2003 | Cahill-O'Brien et al. | .... | 375/354 |
| 2006/0071768 | A1 | * | 4/2006 | Iwazumi et al. | ............. | 340/447 |
| 2007/0116104 | A1 | * | 5/2007 | Fujiwara et al. | ............. | 375/149 |

FOREIGN PATENT DOCUMENTS

| JP | 2003-94917 A | 4/2003 |
| JP | 2006-306202 A | 11/2006 |
| JP | 2006-329883 A | 12/2006 |
| JP | 2007-108178 A | 4/2007 |

* cited by examiner

Primary Examiner—Juli Lieu
(74) Attorney, Agent, or Firm—Crowell & Moring LLP (57) ABSTRACT A tire pressure monitoring system is capable of ensuring accuracy of the rate of transmission of data via wireless communications without an increase in the number of oscillators and an increase in the cost. The tire pressure monitoring system includes a tire pressure measuring module. The tire pressure measuring module has a microcomputer, an activation control circuit, a pressure sensor, a temperature sensor, a frequency divider, a transmitting circuit, and a battery. The microcomputer has a clock pulse generator, analog-to-digital converter circuits and a controller. The transmitting circuit has an oscillator circuit. The frequency divider divides the frequency of a carrier wave CW output from the oscillator circuit to generate a clock signal, and outputs the clock signal to the controller included in the microcomputer. The clock signal is used for the timing for outputting data to a data signal line DL. The clock signal for high precision data transmission can be generated without the need to provide an expensive oscillator in the microcomputer since the oscillator circuit is used in the transmitting circuit, and the clock signal used for data transmission by the microcomputer is generated by the inexpensive frequency divider.

11 Claims, 11 Drawing Sheets

TIRE PRESSURE MONITORING SYSTEM

BACKGROUND OF THE INVENTION

1. Field of the Invention

The present invention relates to a system for monitoring pressure of a gas present in a tire used for a vehicle or the like.

2. Description of the Related Art

In recent years, there has been increasing attention to a system for measuring pressure of a gas present in a tire used for a vehicle or the like and providing an alarm when the pressure is reduced. This results from the following: it is necessary that the pressure of a gas present in a tire used for a vehicle be maintained to approximately 220 kPa at a room temperature; and a reduction in the pressure of the gas present in the tire may not only degrade ride comfort or fuel efficiency but also break the tire.

In the United States, it is required that each vehicle have a system for monitoring pressure of gases present in tires used for the vehicle by law.

However, it is difficult that power is supplied from the outside of a tire to a tire pressure measuring module mounted in the tire since the tire is a rotating body. This results in the fact that the tire pressure measuring module has a battery mounted therein in many cases.

Each vehicle, however, is used for a long time (for example, 10 years) although the amount of power that the battery can supply is limited. It is therefore necessary to reduce consumed power. For example, a module described in JP-A-2003-94917 is known.

The module described in JP-A-2003-94917 has, mounted therein, a circuit for detecting rotation of a tire to determine whether a vehicle is running or stopped. The circuit is operated during the running of the vehicle to detect pressure of a gas present in the tire. The module transmits to the vehicle a pressure level or the like measured via wireless communications using the UHF band.

SUMMARY OF THE INVENTION

In a method described in JP-A-2003-94917, accuracy of the rate of transmission of data via wireless communications is ensured by a program executed by a microcomputer, which is operated by a drive clock signal generated by a quartz oscillator having high frequency stability.

The increase in the number of oscillators leads to an increase in the area of a board and an increase in the cost.

It is, therefore, an object of the present invention to provide a tire pressure monitoring system capable of ensuring accuracy of the rate of transmission of data via wireless communications without an increase in the number of oscillators and an increase in the cost.

To accomplish the abovementioned object, the system according to the present invention is configured as follows.

The tire pressure monitoring system includes: a pressure sensor for converting pressure of a gas present in a tire into an electrical signal and outputting the electrical signal; a converter for converting the electrical signal output from the pressure sensor into a digital signal and outputting the digital signal; an oscillator circuit for outputting a carrier wave to be used to wirelessly transmit data output from the converter, the data including information on the pressure of the gas; a transmitter for wirelessly transmitting the data to the outside of the tire; a battery for supplying power to the pressure sensor, the converter, and the transmitter; and a frequency divider for dividing the frequency of the carrier wave output from the oscillator circuit to generate a clock signal and outputting the clock signal to the converter, wherein the converter uses the clock signal output from the frequency divider for the timing for transmission of the data to the transmitter.

The tire pressure monitoring system according to the present invention is capable of reducing variations in rates of data transmissions performed by devices via wireless communications by means of a simple circuit of each device without using an oscillator having high frequency stability for generation of a drive clock signal for operating a microcomputer.

DESCRIPTION OF THE PREFERRED EMBODIMENTS

Embodiments of the present invention will be described with reference to the accompanying drawings.

First Embodiment

A description will be made of the configuration and operations of a tire pressure monitoring system according to a first embodiment of the present invention with reference to FIG. 1 to FIG. 7.

Figure 1:
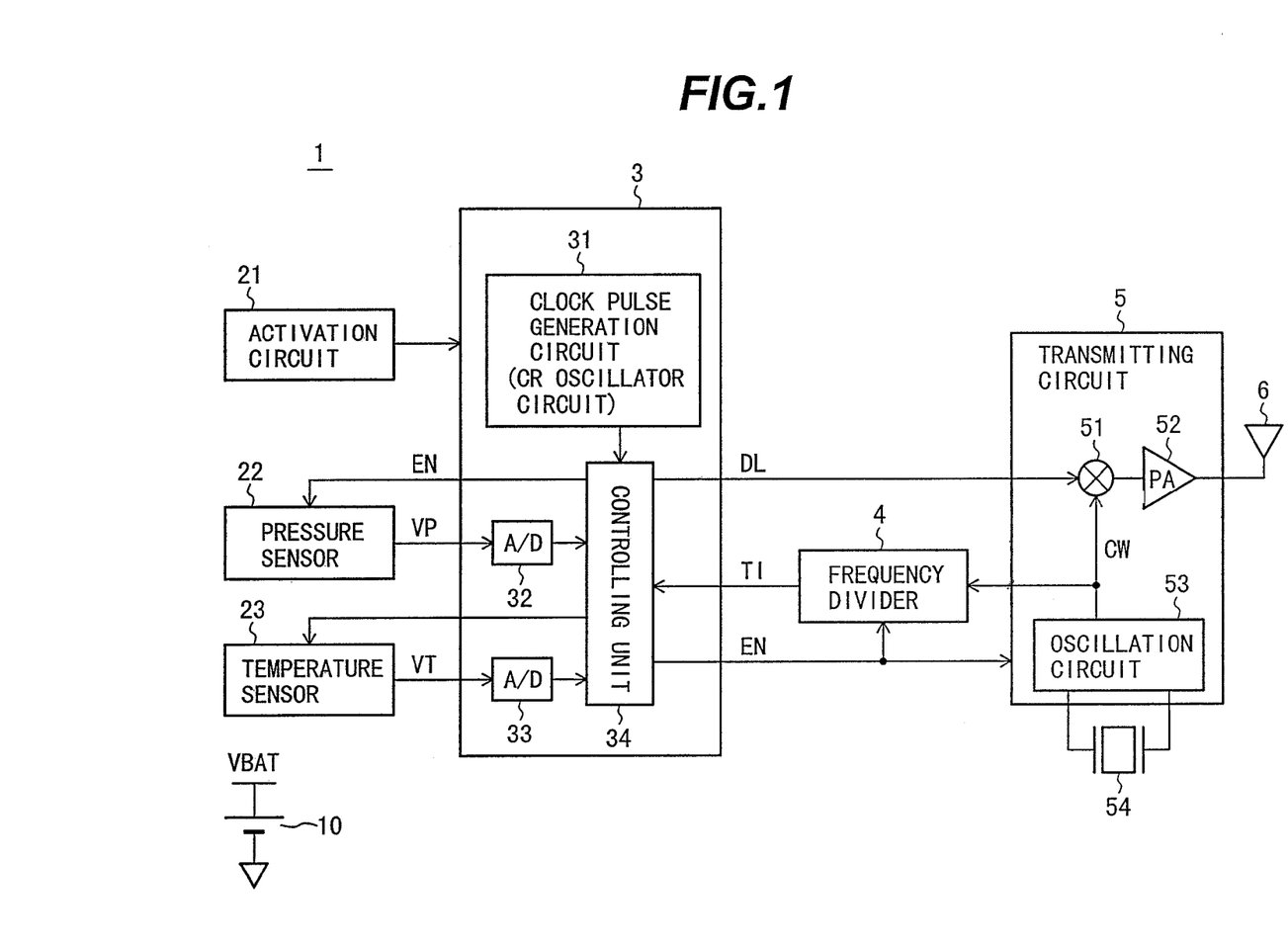
FIG. 1 is a diagram showing an outline configuration of a tire pressure measuring module included in a tire pressure monitoring system according to a first embodiment of the present invention.
Figure 2:
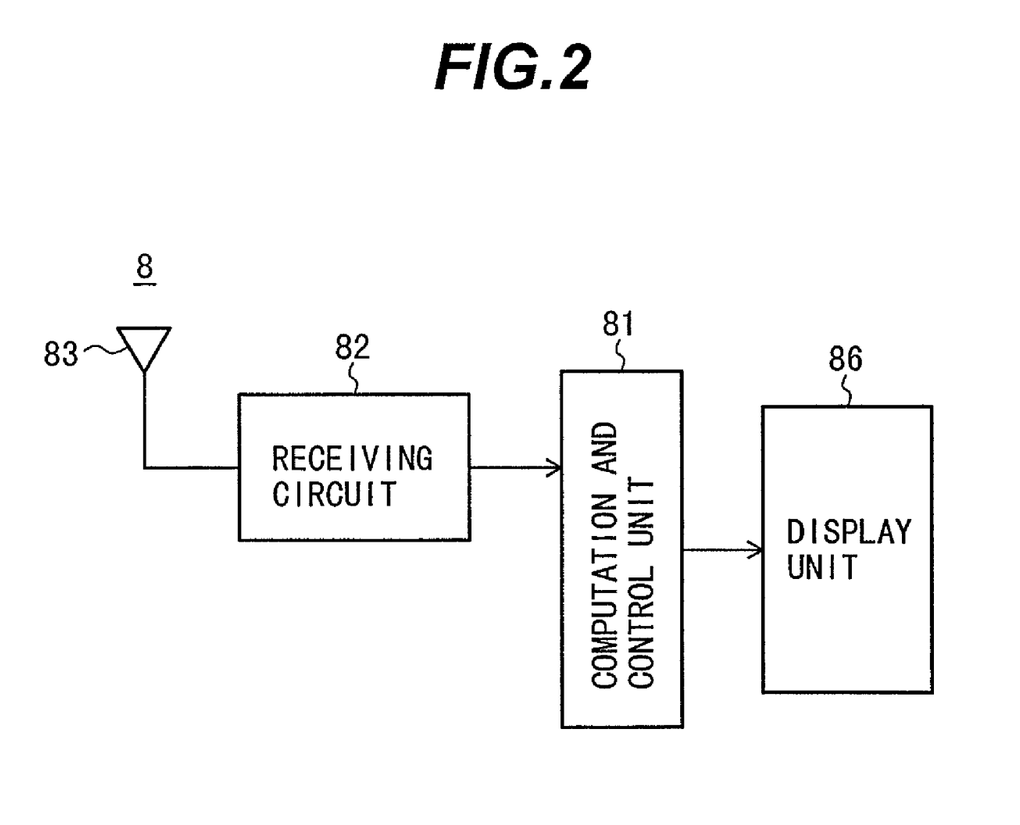
FIG. 2 is a block diagram showing an outline configuration of an in-vehicle device included in the tire pressure monitoring system according to the first embodiment of the present invention.
Figure 3:
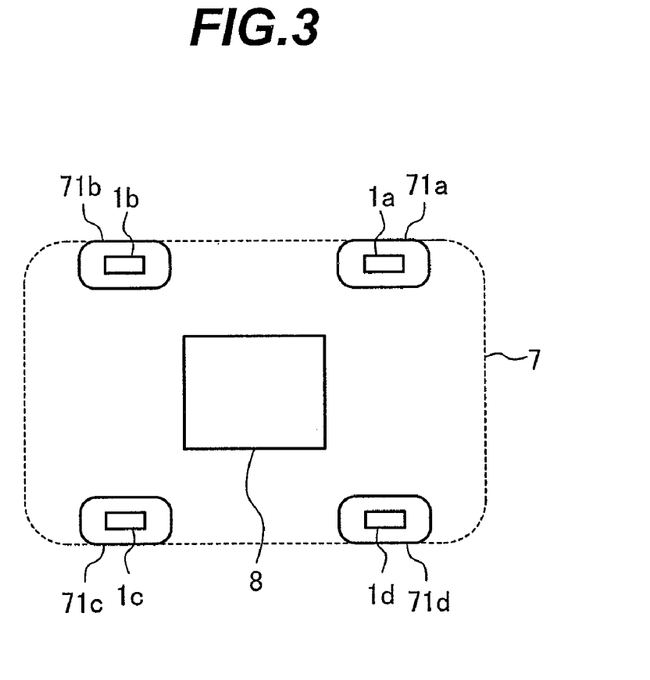
FIG. 3 is a diagram showing an outline configuration of the tire pressure monitoring system when viewed from a bottom surface of a vehicle.

First, a description will be made of the entire construction of the system using the tire pressure monitoring apparatus according to the first embodiment of the present invention with reference to FIG. 1 to FIG. 4. FIG. 1 is a diagram showing an outline configuration of a tire pressure measuring module 1. FIG. 2 is a block diagram showing an outline configuration of an in-vehicle device 8. FIG. 3 is a diagram showing the entire configuration of the tire pressure monitoring system when viewed from a bottom surface of a vehicle.

The entire configuration of the tire pressure monitoring system will be described with reference to FIG. 3. Referring to FIG. 3, a vehicle 7 has tires 71a to 71d arranged on the front-left, front-right, rear-left, and rear-right sides thereof, respectively. The vehicle 7 also has tire pressure measuring modules 1a to 1d provided in the respective tires 71a to 71d. The vehicle 7 also has the in-vehicle device 8.

The tire pressure measuring module 1 will be described with reference to FIG. 1. The tire pressure measuring module 1 mainly includes a microcomputer (converter) 3, an activation control circuit 21, a pressure sensor (gas pressure sensor) 22, a temperature sensor 23, a frequency divider 4, a transmitting circuit 5, and a battery 10 for supplying power with a voltage VBAT to the entire tire pressure measuring module 1.

Figure 4:
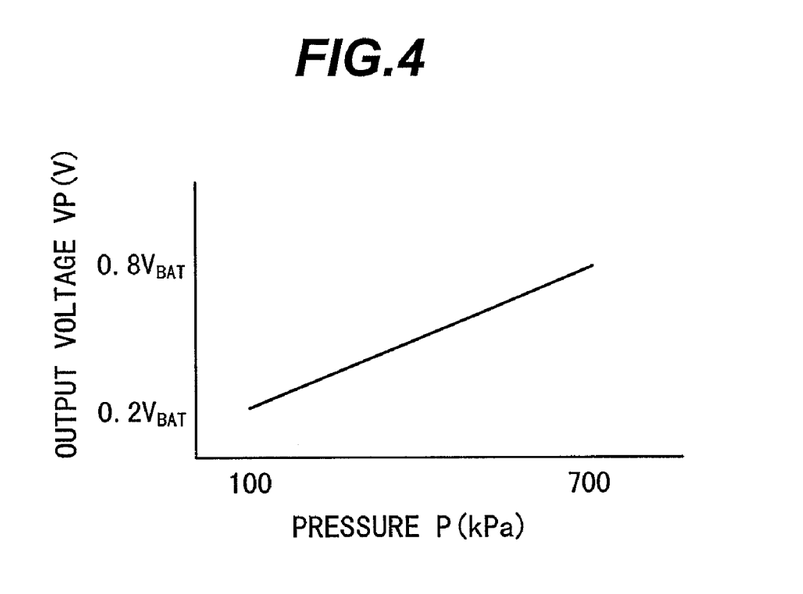
FIG. 4 is a graph showing an example of the relationship between a pressure value P measured by a pressure sensor and a voltage VP output from the pressure sensor.

The pressure sensor 22 is a circuit for converting pressure of a gas present in a tire into a voltage signal and outputting the voltage signal. As shown in FIG. 4, for example, the pressure sensor 22 has output characteristics in which a voltage output from the pressure sensor 22 is increased as pressure P measured by the pressure sensor 22 is increased.

The temperature sensor 23 is a circuit for converting the temperature of the gas present in the tire into a voltage signal and outputting the voltage signal. Each of the pressure sensor 22 and the temperature sensor 23 can be controlled to permit and prevent output of a signal by means of a control signal output from the microcomputer 3 to an enable control signal line EN. In other words, each of the pressure sensor 22 and the temperature sensor 23 becomes in a non-operating state when it is controlled to prevent a signal from being output. These operations can reduce the amount of a current to be consumed.

The microcomputer 3 includes a clock pulse generator 31, analog-to-digital converter circuits 32 and 33, and a controller 34. The clock pulse generator 31 partially includes a built-in or external circuit, which is used as a clock for driving each part of the microcomputer 3. The analog-to-digital converter circuit 32 is adapted to convert a voltage signal VP output from the pressure sensor 22 into a digital value. The analog-to-digital converter circuit 33 is adapted to convert a voltage signal VT output from the temperature sensor 23 into a digital value. The controller 34 computes at least one of the converted digital values when necessary and outputs the computed data as digital value(s) to a data signal line DL.

The clock pulse generator 31 is, for example, a charge and discharge cycle circuit including a capacitor C, resistor R, and an inverter. The clock pulse generator 31 has a frequency of, for example, 4 MHz. The frequency of the clock pulse generator 31 included in the tire pressure measuring module 1 (which is any one of the tire pressure measuring modules 1a to 1d) may be different by approximately ±30% from the frequency (frequencies) of the clock pulse generator(s) 31 included in any other one or more of the tire pressure measuring modules 1a to 1d, due to a variation of at least one of the capacitor C and the resistor R, which are included in the clock pulse generator 31 included in the tire pressure measuring module 1. The transmitting circuit 5 is adapted to wirelessly transmit to the in-vehicle device 8 (shown in FIG. 2) the data output from the microcomputer 3 to the data signal line DL.

The transmitting circuit 5 includes an oscillator circuit 53, a multiplier 51, and a power amplifier 52. The oscillator circuit 53 oscillates an oscillator 54 to output a carrier wave CW. The multiplier 51 multiplies the digital value (obtained from the voltage signal output from the pressure sensor 22 or the temperature sensor 23) output from the microcomputer 3 by the carrier wave CW to modulate the multiplied data using amplitude shift keying (ASK) and outputs the modulated data. The power amplifier 52 amplifies the data output from the multiplier 51 and outputs the amplified data to an antenna 6.

The carrier wave CW has a frequency of, for example, 315.0 MHz. As the oscillator 54, a surface acoustic wave (SAW) oscillator is used, for example. The frequency divider 4 divides the frequency of the carrier wave CW output from the oscillator circuit 53 and outputs a clock signal obtained by the frequency division to the controller 34 included in the microcomputer 3. Specifically, the frequency divider 4 divides the frequency of the carrier wave CW having a frequency of 315.0 MHz by 2 raised to the 15th power to obtain a clock signal having a frequency of 9.613 kHz. The clock signal obtained by the frequency division is output to a timing signal line TI and input to the microcomputer 3. The clock signal input to the microcomputer 3 is used for the timing for output of data to the data signal line DL.

The microcomputer 3 typically has an oscillator similar to the oscillator 54 and generates a clock signal for data transmission. According to the first embodiment, although the microcomputer 3 does not have an expensive oscillator, the frequency divider 4 divides the frequency of the carrier wave CW output from the oscillator circuit 53 included in the transmitting circuit 5 to generate a clock signal, which is used for transmission of data by the microcomputer 3. The frequency divider 4 is more inexpensive than such an oscillator.

According to the first embodiment, the oscillator circuit 53 is provided in the transmitting circuit 5, and the inexpensive frequency divider 4 generates a clock signal by using a carrier wave CW output from the oscillator circuit 53. The clock signal is used for transmission of data by the microcomputer 3. Therefore, a clock signal capable of high-precision data transmission is generated by the frequency divider 4 without the need to arrange an expensive oscillator for the microcomputer 3.

It can be considered that the clock pulse generator 31 included in the microcomputer 3 is used to generate a clock signal for the data transmission. As described above, however, there may be a variation of at least one of the capacitor C and the resistor R, which are included in the clock pulse generator 31. This results in the fact that the data transmission rate may be varied.

Thus, the oscillator circuit 53 provided in the transmitting circuit 5 and the inexpensive frequency divider 4 can be used to generate a clock signal capable of high-precision data transmission.

Each of the transmitting circuit 5 and the frequency divider 4 can be controlled to permit and prevent its operation by means of a control signal output to the enable control signal line EN from the microcomputer 3. This reduces the amount of a current to be consumed.

When a rotation sensor or an acceleration sensor detects that a tire rotates, the activation control circuit 21 outputs a trigger pulse at a constant interval (for example, every 10 seconds). The microcomputer 3 is activated from a sleeping mode by the trigger pulse. The battery 10 has a nominal capacity of 500 mAh and a nominal voltage of 3 volts.

The in-vehicle device 8 shown in FIG. 2 includes a receiving circuit 82, a computation and control circuit 81, an antenna 83, and an indicator 86. The computation and control circuit 81 receives data from the receiving circuit 82 and calculates the received data. The indicator 86 displays a measured value and an alarm.

The computation and control circuit 81 receives data wirelessly transmitted from the tire pressure measuring module 1 (shown in FIG. 1) through the receiving circuit 82, and causes the indicator 86 to display a measured pressure value, and a notice and an alarm for a reduction in the pressure. It should be noted that power necessary for an operation of the in-vehicle device 8 is supplied from a battery (not shown) provided in the vehicle.

Next, a description will be made of outline operations of the tire pressure measuring module 1 with reference to FIGS. 5 to 7. The tire pressure measuring module 1 is operated by a program (stored in a memory (not shown)) executed by the microcomputer 3 and in accordance with a flowchart shown in FIG. 5.

Figure 5:
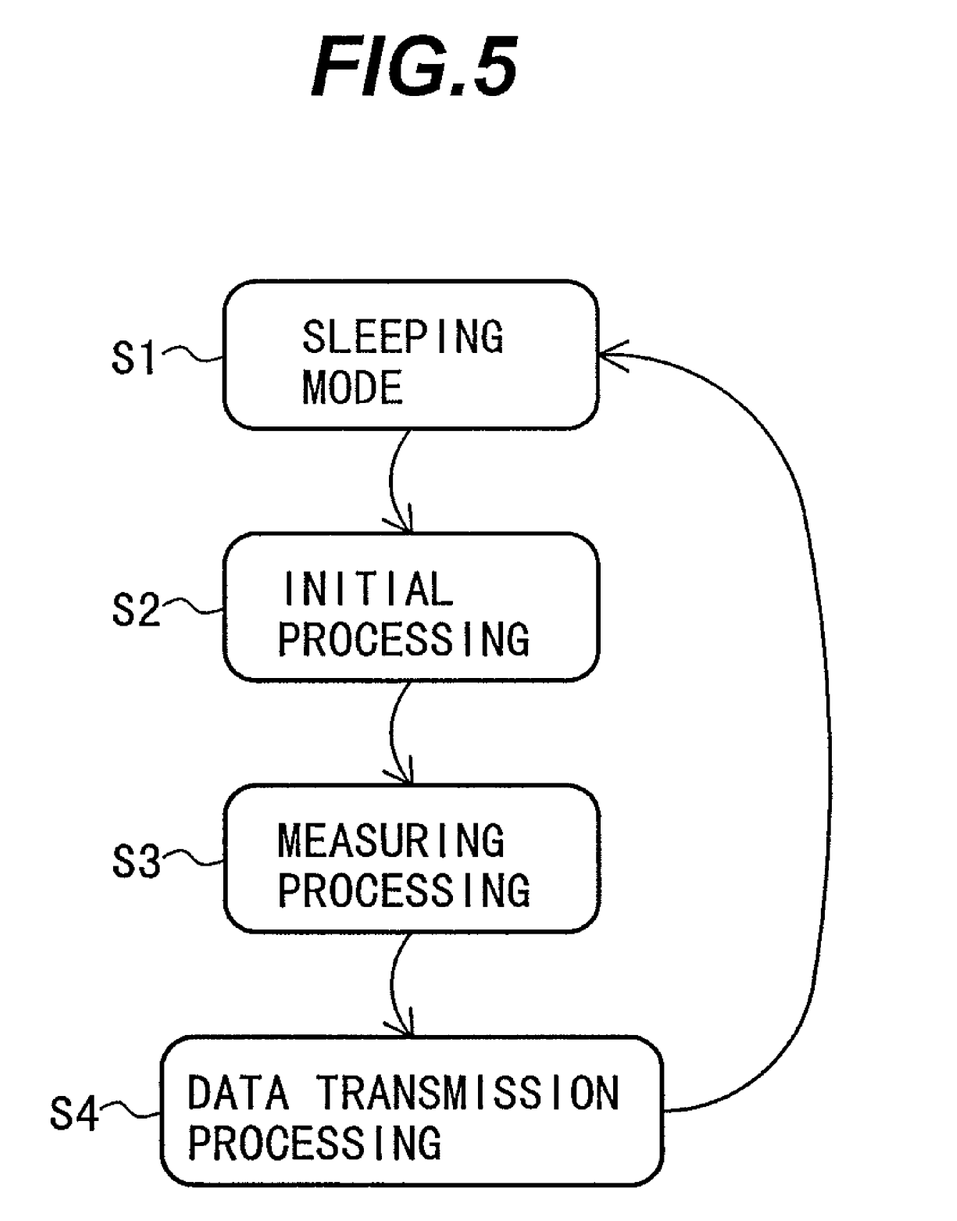
FIG. 5 is a flowchart showing outline operations of a tire pressure measuring module according to the first embodiment.

In a process shown in FIG. 5, the tire pressure measuring module 1 is normally in a sleeping mode (in step S1). In the sleeping mode, the clock pulse generator 31, the controller 34, the analog-to-digital converter circuits 32 and 33, the pressure sensor 22, the temperature sensor 23, the transmitting circuit 5, and the frequency divider 4 are in respective non-operating states. A current consumed by the entire tire pressure measuring module 1 is the minimum when the tire pressure measuring module 1 is in the sleeping mode.

When the tire pressure measuring module 1 is in the sleeping mode (in step S1) and the trigger pulse is input from the activation control circuit 21 to the microcomputer 3, the process shown in FIG. 5 proceeds to initial processing (in step S2). In the initial processing (in step S2), the clock pulse generator 31 is activated from the non-operating state and generates a clock signal, and the tire pressure measuring module 1 starts to operate based on the program.

Next, the process proceeds to measuring processing (in step S3). In the measuring processing (in step S3), the pressure sensor 22 and the temperature sensor 23 are operated by means of the control signal output from the microcomputer 3 to obtain a measured value of pressure of a gas present in a tire and a measured value of a temperature of the inside of the tire, respectively. After the measured pressure value and the measured temperature value are obtained, the pressure sensor 22 and the temperature sensor 23 become in respective non-operating states by means of the control signal output from the microcomputer 3.

Then, the process proceeds to data transmission processing (in step S4). In the data transmission processing (in step S4), the transmitting circuit 5 and the frequency divider 4 are operated by means of the control signal output from the microcomputer 3. The oscillator circuit 53 then starts to oscillate and generates the carrier wave CW. The frequency divider 4 outputs a timing signal to the microcomputer 3 through the timing signal line TI. The timing signal output from the frequency divider 4 is used for sequential output of a data bit string.

The data transmitted from the microcomputer 3 to the transmitting circuit 5 includes, for example, a start bit ST (1 bit), an identification number ID (16 bits) for identifying the tire pressure measuring module 1 (which is a corresponding one of the tire pressure measuring modules 1a to 1d), the measured pressure value P (8 bits), the measured temperature value T (8 bits), and a stop bit SP (1 bit). The bit string having 34 bits is encoded using a non-return to zero (NRZ) scheme and output from the microcomputer 3 to the data signal line DL.

Figure 6:
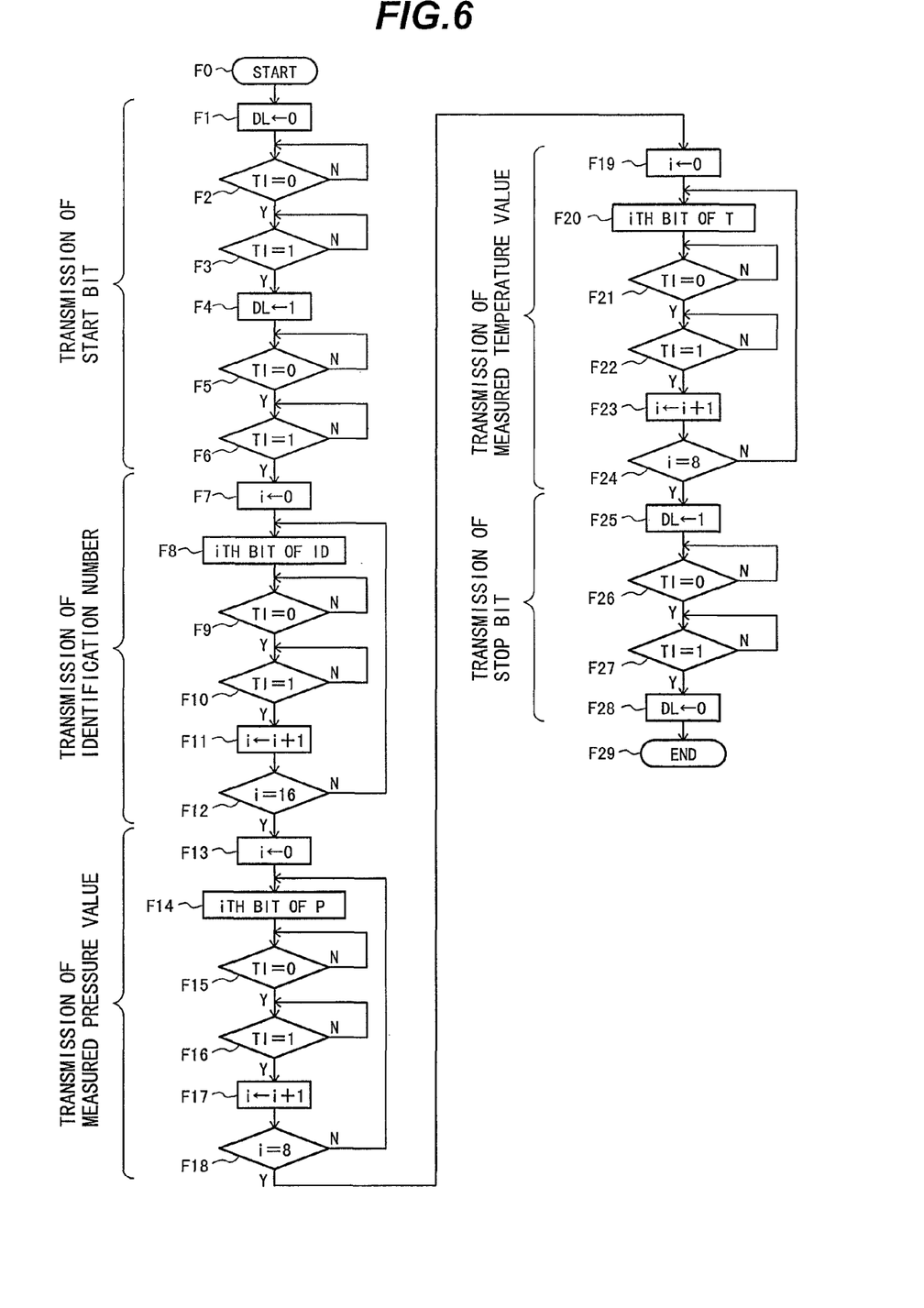
FIG. 6 is a flowchart showing operations of the tire pressure measuring module according to the first embodiment during data transmission.
Figure 7:
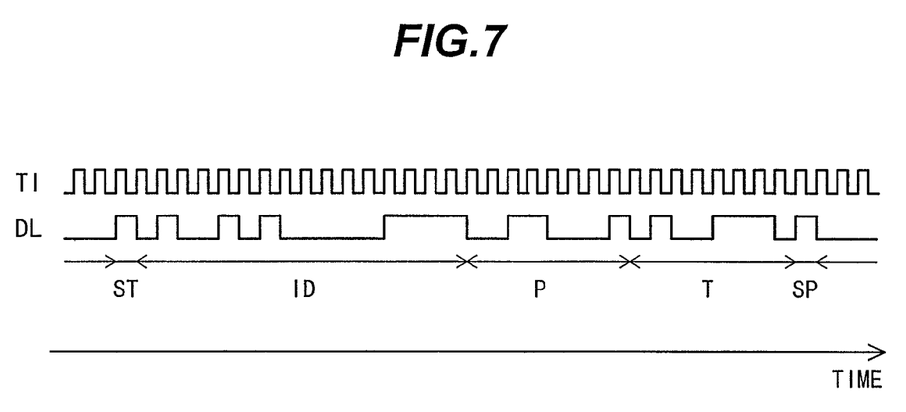
FIG. 7 is a diagram showing an example of the wave forms of signals generated by the tire pressure measuring module according to the first embodiment.

The microcomputer 3, for example, sequentially broadcasts a data bit string represented by binary numbers of 1s and 0s to the data signal line DL at the rising timing of the timing signal TI shown in FIG. 7 in accordance with a flowchart shown in FIG. 6. The transmitting circuit 5 modulates the output data using the amplitude shift keying ASK and wirelessly transmits the modulated data to the in-vehicle device 8 through the antenna 6.

Specifically, the flowchart shown in FIG. 6 includes steps F0 to F29. The start bit ST is transmitted in steps F1 to F6. The identification number ID is transmitted in steps F7 to F12. The measured pressure value P is transmitted in steps F13 to F18, and the measured temperature value T is transmitted in steps F19 to F24. The stop bit SP is transmitted in steps F25 to F28.

First, the data signal line DL is in an initial state indicating "0" in step F1. Next, the microcomputer 3 confirms that the timing signal line TI indicates "0" in step F2. Then, the microcomputer 3 confirms that the timing signal line TI indicates "1" in step F3. In this way, the microcomputer 3 can confirm that the timing signal line TI rises from "0" to "1".

Then, the microcomputer 3 outputs a bit signal indicating "1" to the data signal line DL to broadcast the start bit indicating "1" in step F4. The microcomputer 3 then confirms that the value indicated by the timing signal line TI changes from "1" to "0" in step F5, and that the value indicated by the timing signal line TI changes from "0" to "1" in step F6. The start bit indicating "1" is maintained in steps F5 and F6.

Then, the identification number ID is transmitted. Since the identification number ID has 16 bits, a counter i is prepared to count the bit length of 16 bits. The counter i is initialized in step F7. The initial bit signal of the identification number ID is then output to the data signal line DL in step F8. The output bit signal is maintained in steps F9 and F10. The counter i is incremented in step F11. Steps F7 to F12 are repeated until the counter i indicates 16. The bit signals (constituting a bit string) of the identification number ID are sequentially output to the data signal line DL.

Similarly, the measured pressure value P and the measured temperature value T are output to the data signal line DL in steps F13 to F24.

Lastly, the stop bit indicating "1" is output to the data signal line DL in step F25 and maintained in steps F26 and F27. A bit signal indicating "0" is output to the data signal line DL in step F28.

After the data transmission is completed, the transmitting circuit 5 and the frequency divider 4 becomes in non-operating states by means of the control signal output from the microcomputer 3. The process then proceeds back to the sleeping state (in step S1) shown in FIG. 5.

The abovementioned configuration makes it possible to sufficiently reduce variation in the data transmission speed as compared with the case where a data bit string is output based on a clock signal generated by the clock pulse generator 31 (causing a wide variety of tire pressure measuring modules) by using a program executed by the microcomputer 3.

A reception synchronization signal can be easily generated based on an internal clock of the in-vehicle device 8 after the in-vehicle device 8 receives the start bit ST for reception of data on the pressure of the gas present in the tire and the like by the in-vehicle device 8.

It can be considered that the data is transmitted based on a clock signal generated by the clock pulse generator 31 (included in the microcomputer 3) causing a wide variety of tire pressure measuring modules and that the in-vehicle 8 uses an encoding scheme such as Manchester encoding, which easily obtain synchronization between data transmitting and receiving. In this case, a data transmission rate is nearly equal to a half of the data transmission rate in the case where the NRZ scheme is used, resulting in an increase in the communication time. The configuration according to the present embodiment, which uses the NRZ scheme, makes it possible to reduce the communication time and the amount of a current to be consumed.

The transmitting circuit 5 consumes up to a current of, for example, 10 mA. This value is large. The configuration according to the present embodiment makes it possible to reduce the communication time and the amount of a current to be consumed. The configuration also makes it possible to increase the life of the battery. Therefore, a small-sized battery having a small capacity can be used in the configuration according to the present embodiment. The use of a small-sized battery is advantageous for a reduction in the weight of the tire pressure measuring module.

The data bit string to be transmitted may include the following data: an error correction code; physical information such as an acceleration measured by the tire pressure measuring module; a voltage of the battery (battery 10); and a flag indicating the result of a self-diagnosis of the tire pressure measuring module. In addition, a non-return to zero inversion (NRZI) scheme may be used as the encoding scheme. Furthermore, data subjected to 4B/5B conversion may be used.

The frequency divider 4 may have a configuration in which the divisor can appropriately be changed. For example, the frequency divider 4 may be configured to ensure that the frequency divider 4 includes a plurality of input terminals, has a plurality of divisors set for the respective input terminals, and selects any one of the input terminals to change one divisor to other divisor corresponding to the selected input terminal.

Second Embodiment

A description will be made of the configuration and operations of a tire pressure monitoring system according to a second embodiment of the present invention with reference to FIG. 8. Since the basic configuration of the tire pressure monitoring system according to the second embodiment is similar to that of the tire pressure monitoring system according to the first embodiment, only different points between the first and second embodiments will be described.

Figure 8:
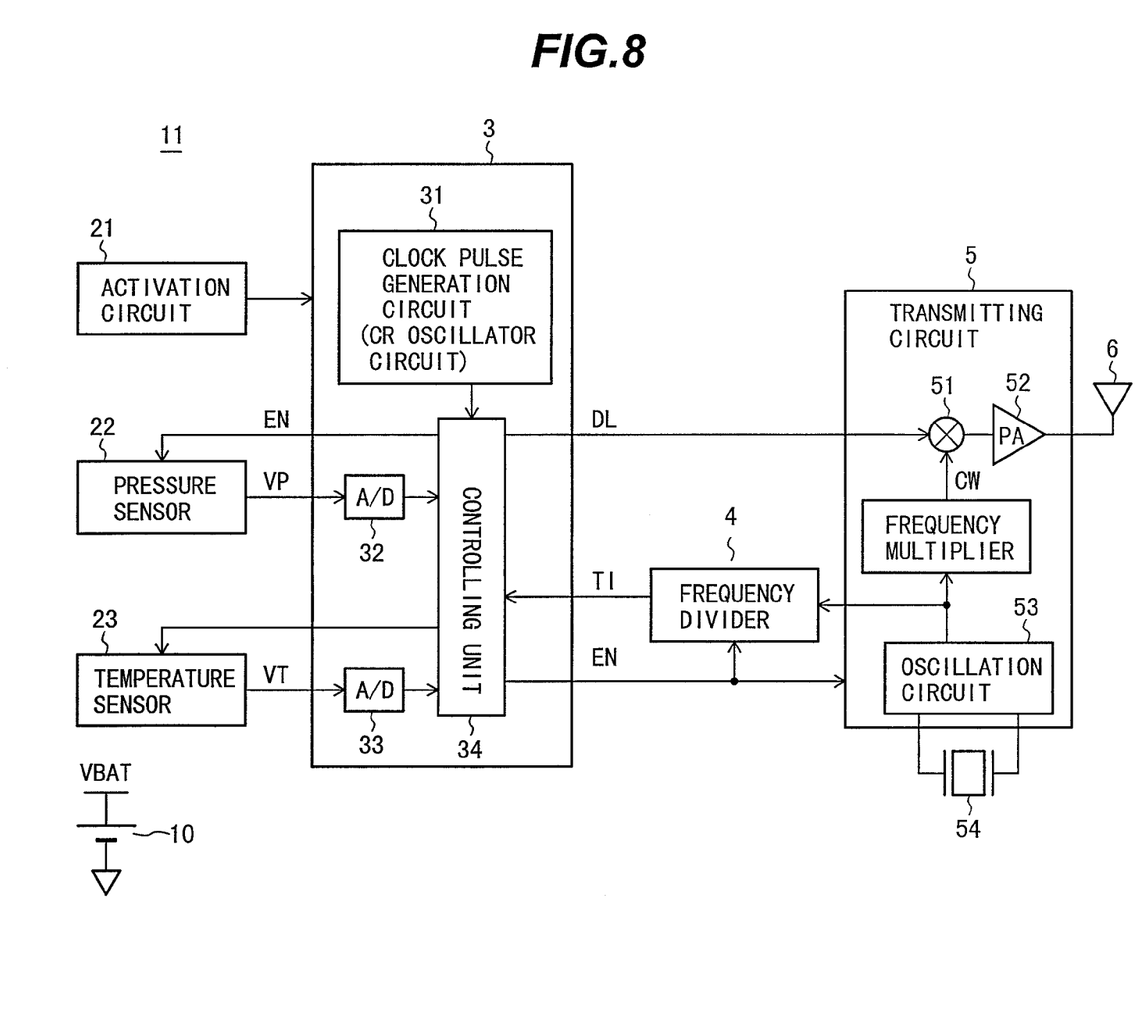
FIG. 8 is a diagram showing an outline configuration of a tire pressure measuring module included in a tire pressure monitoring system according to a second embodiment of the present invention.

That is, a frequency multiplier 55 is provided between the oscillator circuit 53 and the multiplier 51 in the second embodiment as shown in FIG. 8. In addition, the oscillator 54 provided for the transmitting circuit 5 is, for example, a crystal oscillator having an oscillation frequency of 9.84375 MHz in the second embodiment in place of the surface acoustic wave oscillator according to the first embodiment. The frequency multiplier 55 multiplies the oscillation frequency by 32 to obtain a signal having a frequency of 315.0 MHz and outputs the obtained signal to the multiplier 51.

The frequency divider 4 divides the oscillation frequency of 9.84375 MHz by 2 raised to 10th power to obtain a clock signal having a frequency of 9.613 kHz.

The tire pressure monitoring system having the abovementioned configuration according to the second embodiment can obtain a similar effect to that in the first embodiment. In the second embodiment, the crystal oscillator having an oscillation frequency of 9.84375 MHz is used, and the frequency divider 4 divides the oscillation frequency by 2 raised to 10th power. In the second embodiment, therefore, a higher precision data transmission rate can be achieved compared with that in the first embodiment.

Third Embodiment

A description will be made of the configuration and operations of a tire pressure monitoring system according to a third embodiment of the present invention with reference to FIG. 9. Since the basic configuration of the tire pressure monitoring system according to the third embodiment is similar to that of the tire pressure monitoring system according to the first embodiment, only different points between the first and third embodiments will be described.

Figure 9:
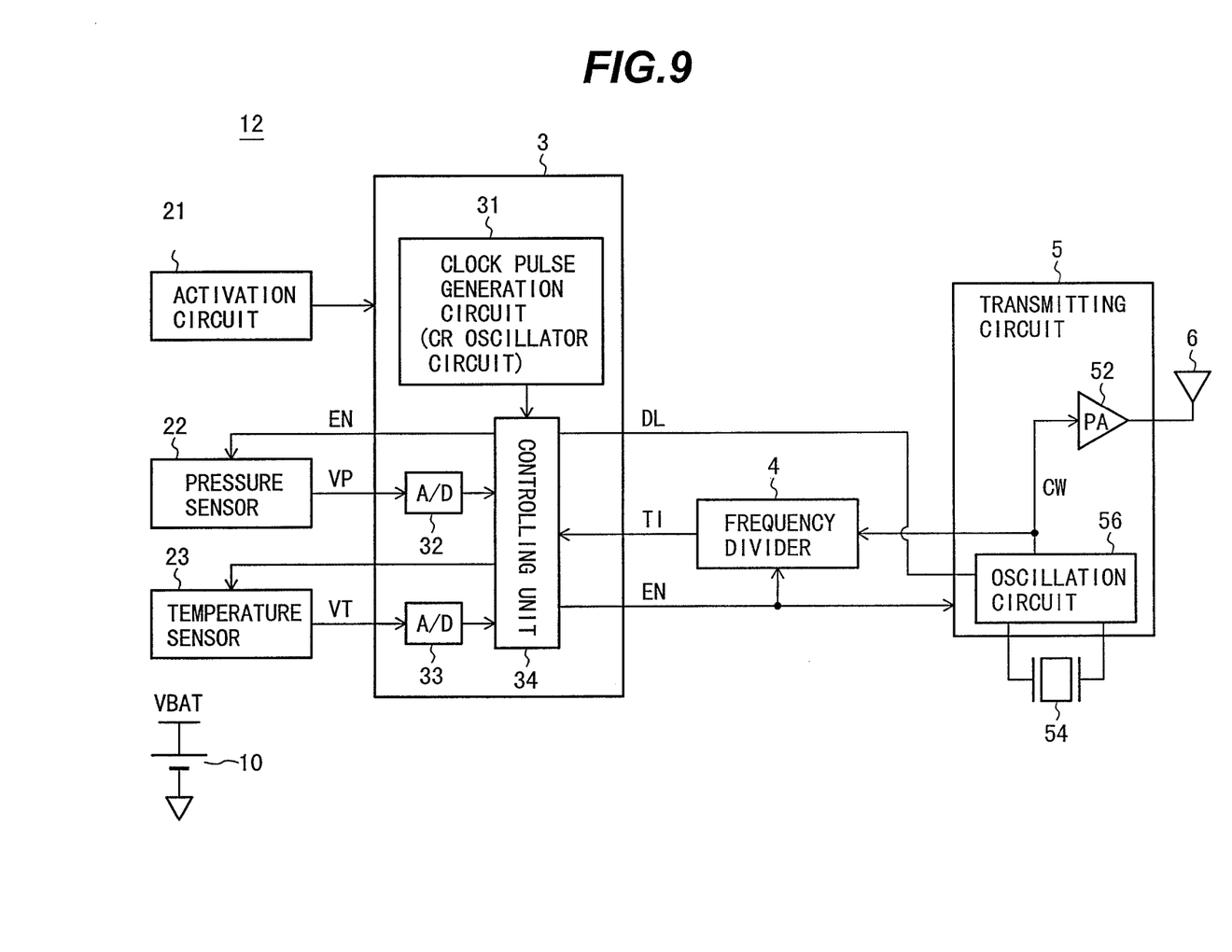
FIG. 9 is a diagram showing an outline configuration of a tire pressure measuring module included in a tire pressure monitoring system according to a third embodiment of the present invention.

That is, frequency shift keying (FSK) modulation is used in a transmitting circuit 50 in the third embodiment in place of the amplitude shift keying modulation used in the first embodiment, as shown in FIG. 9. Specifically, the frequency of a carrier wave oscillated by an oscillator circuit 56 is switched to a frequency of, for example, 315.0 MHz or 315.1 MHz by means of a signal output to the data signal line DL and indicating "0" or "1".

In this case, the frequency of a timing signal generated by the frequency divider 4 varies within a range of 0.03%. This variation is extremely small and ignorable. There is therefore little possibility that a shift of synchronization, which is used for reception of data by the in-vehicle device 8, occurs.

The tire pressure monitoring system having the abovementioned configuration according to the third embodiment can obtain a similar effect to that in the first embodiment.

Fourth Embodiment

A description will be made of the configuration and operations of a tire pressure monitoring system according to a fourth embodiment of the present invention with reference to FIGS. 10 to 12. Since the basic configuration of the tire pressure monitoring system according to the fourth embodiment is similar to that of the tire pressure monitoring system according to the first embodiment, only different points between the first and fourth embodiments will be described.

Figure 10:
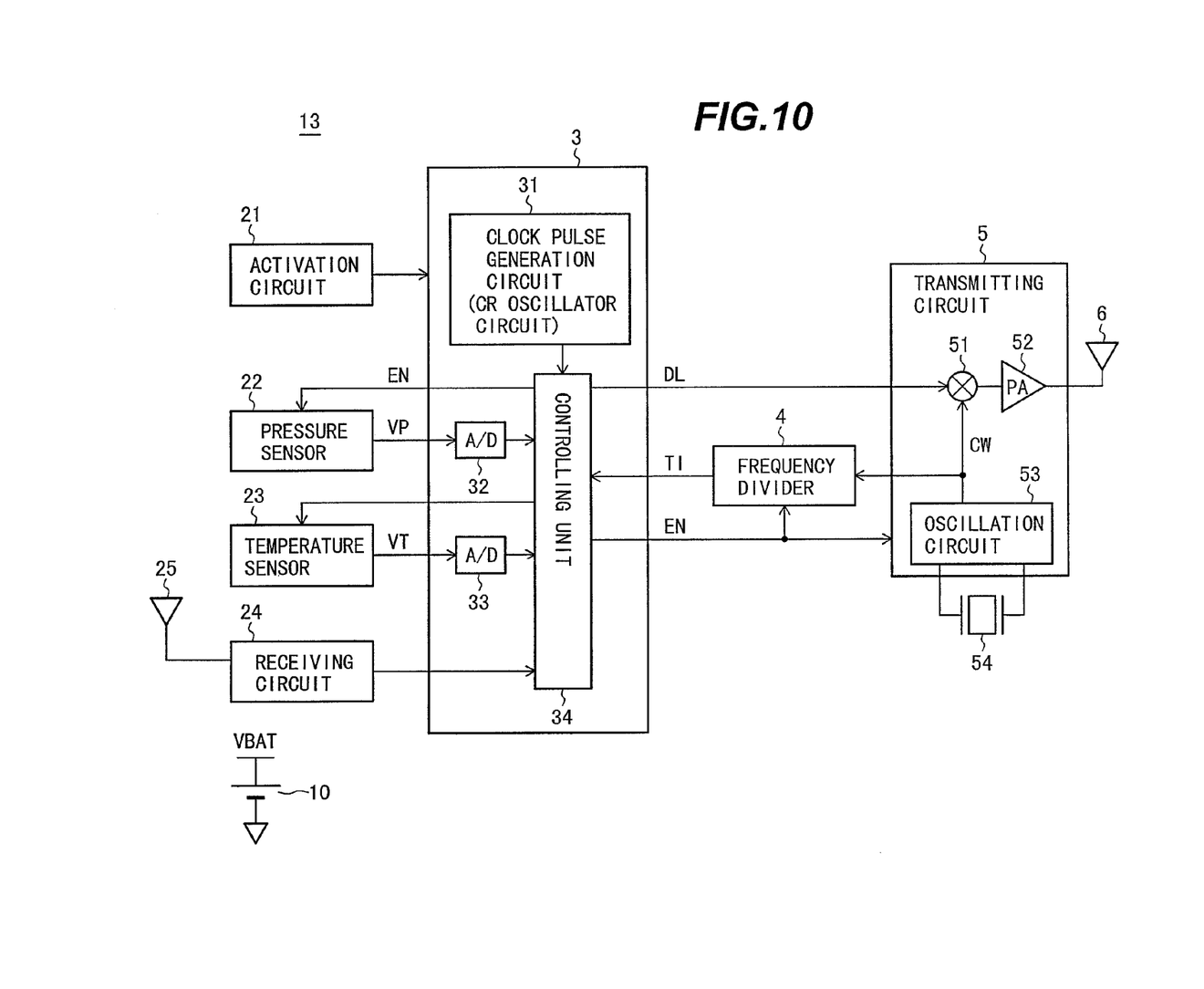
FIG. 10 is a diagram showing an outline configuration of a tire pressure measuring module included in a tire pressure monitoring system according to a fourth embodiment of the present invention.

That is, as shown in FIG. 10, a receiving circuit 24 and an antenna 25 are added to a tire pressure measuring module 13. The receiving circuit 24 and the antenna 25 are adapted to receive a signal wirelessly transmitted by an in-vehicle device 80 (shown in FIG. 11) provided outside the tires.

Figure 11:
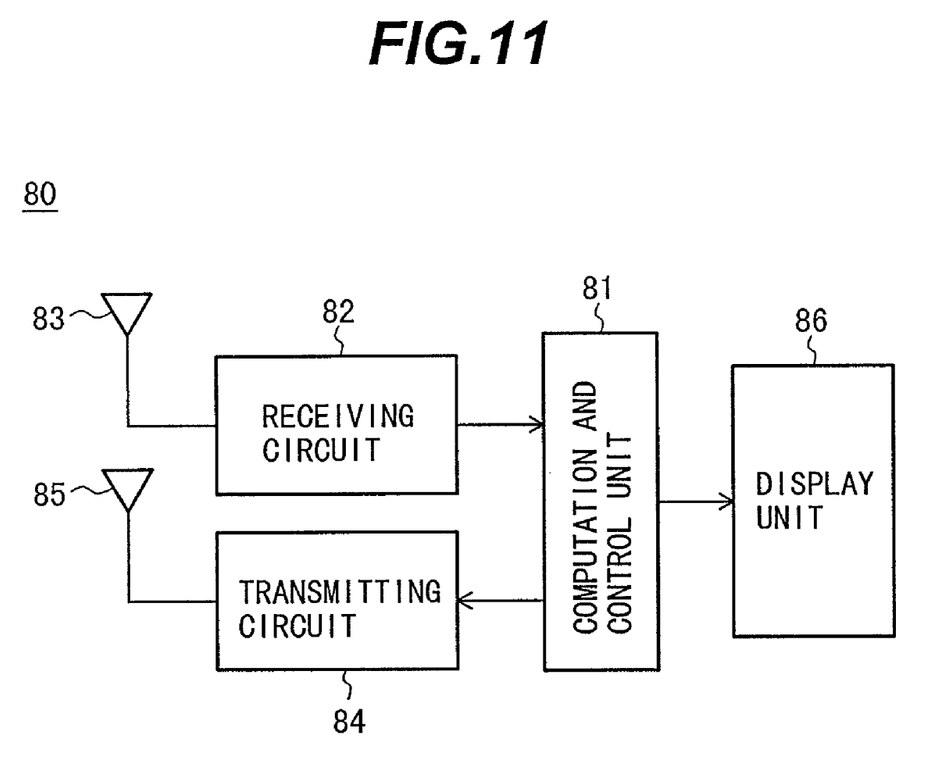
FIG. 11 is a block diagram showing an outline configuration of an in-vehicle device included in the tire pressure monitoring system according to the fourth embodiment.

Referring to FIG. 11, the in-vehicle device 80 is configured by adding a transmitting circuit 84 and an antenna 85 to the in-vehicle device 8 shown in FIG. 2. An LF band, for example, a frequency of 125 kHz, is used for wireless transmission of a carrier wave from the in-vehicle device 80 to the tire pressure measuring module 13. In the fourth embodiment, transmission data obtained by converting the carrier wave by using the NRZ scheme or the NRZI scheme is modulated by using the amplitude shift keying ASK, and communications are performed at a communication rate of, for example, 1 kbps.

Figure 12:
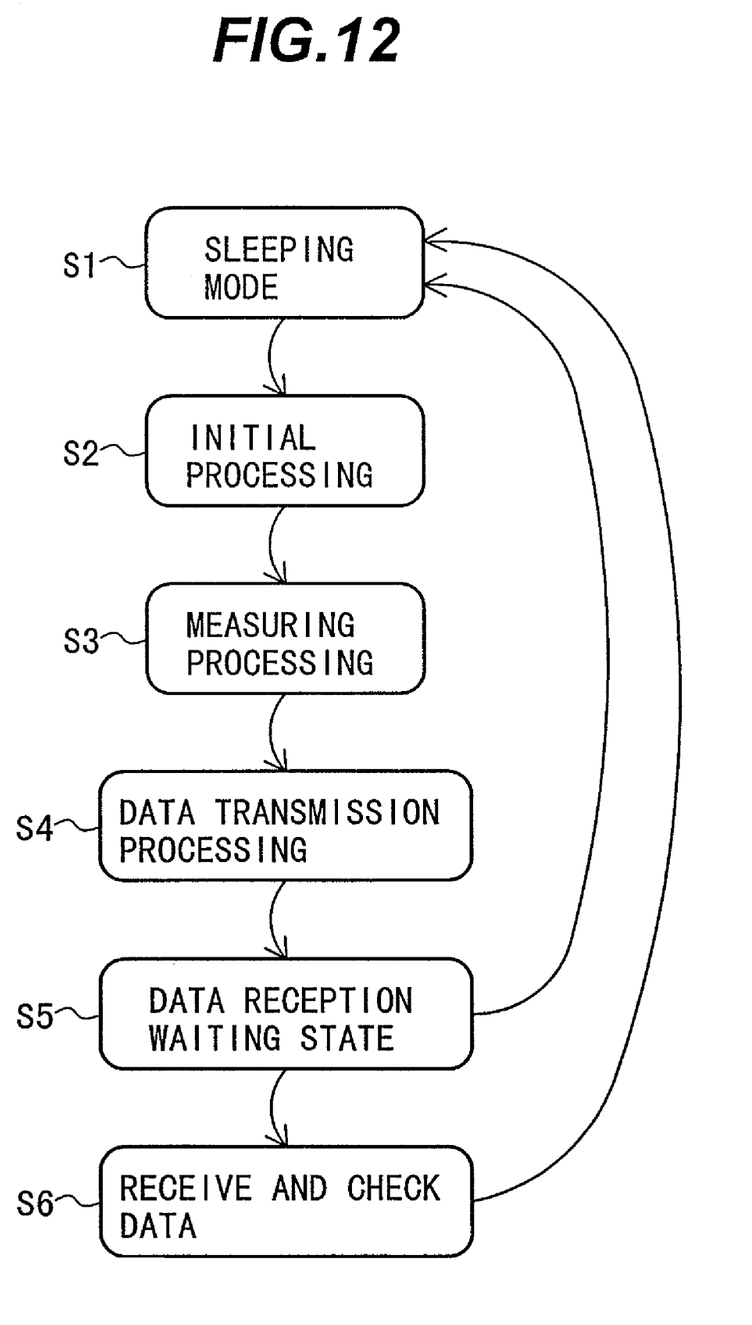
FIG. 12 is a flowchart showing outline operations of the tire pressure measuring module according to the fourth embodiment.

A flowchart shown in FIG. 12 includes steps S5 and S6, which are not included in the flowchart shown in FIG. 5. The tire pressure measuring module 13 becomes in a data reception waiting state (in step S5) after the data transmission processing (in step S4).

The in-vehicle device 80, for example, transmits a signal to be used to change a condition for the operation of the tire pressure measuring module 13 as necessary after the in-vehicle device 80 receives data from the tire pressure measuring module 13. The in-vehicle device 80 transmits the data, and the tire pressure measuring module 13 receives and checks the data (in step S6). The tire pressure measuring module 13 changes the condition for the operation thereof and the like based on the received data. The timing signal line TI is used to perform synchronization for the data reception.

After the tire pressure measuring module 13 completely changes the condition for the operation thereof and the like, the tire pressure measuring module 13 becomes in a sleeping mode (in step S1). In addition, when the tire pressure measuring module 13 does not receive data from the in-vehicle device 80 for a fixed time (for example, 10 milliseconds) in the data reception waiting state (in step S5), the tire pressure measuring module 13 becomes in the sleeping mode (in step S1).

In the abovementioned way, the tire pressure monitoring system having the abovementioned configuration according to the fourth embodiment can obtain a similar effect to that in the first embodiment.

According to the fourth embodiment, the in-vehicle device 80 includes the transmitting circuit 84, and the tire pressure measuring module 13 has the receiving circuit 24 for receiving from the in-vehicle device 80 data to be used to change a condition for the operation and the like. For example, when data such as pressure of a gas present in a tire is transmitted at an interval, the interval can be changed in the fourth embodiment. The tire pressure and the like can be appropriately monitored under various circumstances.

What is claimed is:

1. A tire pressure monitoring system comprising: a pressure sensor for converting pressure of a gas present in a tire into an electrical signal and outputting the electrical signal;
   a converter for converting the electrical signal output from the pressure sensor into a digital value and outputting the digital value;
   an oscillator circuit for outputting a carrier wave to be used to wirelessly transmit data output from the converter, the data including information on the pressure of the gas;
   a transmitter for wirelessly transmitting the data to the outside of the tire;
   a battery for supplying power to the pressure sensor, the converter, and the transmitter; and
   a frequency divider for dividing the frequency of the carrier wave output from the oscillator circuit to generate a clock signal and outputting the clock signal to the converter, wherein
   the converter uses the clock signal output from the frequency divider for the timing for transmission of the data to the transmitter.

2. The tire pressure monitoring system according to claim 1, wherein
   the converter controls the pressure sensor to cause the pressure sensor to be in either one of an operating state and a non-operating state.

3. The tire pressure monitoring system according to claim 1, wherein
   the converter controls the transmitter and the frequency divider to cause the transmitter to be in either one of an operating state and a non-operating state and cause the frequency divider to be in either one of an operating state and a non-operating state.

4. The tire pressure monitoring system according to claim 1, wherein
   the frequency divider includes a plurality of input terminals, has a plurality of divisors, and selects any one of the input terminals to change a divisor of said plurality of divisors.

5. The tire pressure monitoring system according to claim 1, further comprising a temperature sensor for converting the temperature of the gas present in the tire into an electrical signal and outputting the electrical signal, wherein
   the converter converts the electrical signal output from the temperature sensor into a digital value and outputs the digital value.

6. The tire pressure monitoring system according to claim 1, wherein
   the converter encodes the data including the information on the pressure of the gas by using a non-return to zero scheme and outputs the encoded data to the transmitter.

7. The tire pressure monitoring system according to claim 1, wherein
   the converter outputs information on a voltage of the battery to the transmitter.

8. The tire pressure monitoring system according to claim 1, wherein
   the transmitter wirelessly transmits the data to the outside of the tire by using amplitude shift keying modulation.

9. The tire pressure monitoring system according to claim 1, wherein
   the transmitter wirelessly transmits the data to the outside of the tire by using frequency shift keying modulation.

10. A tire pressure monitoring system comprising:
    a pressure sensor for converting pressure of a gas present in a tire into an electrical signal and outputting the electrical signal;
    a converter for converting the electrical signal output from the pressure sensor into a digital value and outputting the digital value;
    an oscillator circuit for outputting a carrier wave to be used to wirelessly transmit data output from the converter, the data including information on the pressure of the gas;
    a transmitter for wirelessly transmitting the data to the outside of the tire;
    a battery for supplying power to the pressure sensor, the converter, and the transmitter; and
    a frequency divider for dividing the frequency of the carrier wave output from the oscillator circuit to generate a clock signal and outputting the clock signal to the converter; and
    a frequency multiplier for multiplying the frequency of the carrier wave output from the oscillator circuit by a certain value to generate a signal having the multiplied frequency and use the generated signal as a carrier wave to be used wirelessly transmit the data, wherein
    the converter uses the clock signal output from the frequency divider for the timing for transmission of the data to the transmitter.

11. A tire pressure monitoring system comprising:
    a pressure sensor for converting pressure of a gas present in a tire into an electrical signal and outputting the electrical signal;
    a converter for converting the electrical signal output from the pressure sensor into a digital value and outputting the digital value;
    an oscillator circuit for outputting a carrier wave to be used to wirelessly transmit data output from the converter, the data including information on the pressure of the gas;
    a transmitter for wirelessly transmitting the data to the outside of the tire;

a battery for supplying power to the pressure sensor, the converter, and the transmitter; and a frequency divider for dividing the frequency of the carrier wave output from the oscillator circuit to generate a clock signal and outputting the clock signal to the converter; and a receiving circuit for receiving a wireless signal from the outside of the tire and outputting the received signal to the converter, the signal indicating an operation condition, wherein the converter uses the clock signal output from the frequency divider for the timing for transmission of the data to the transmitter and the timing for a receiving operation of the receiving circuit.

* * * * *